Feb. 2, 1943.   J. LYMAN ET AL   2,309,853
RATE AND ATTITUDE INDICATING INSTRUMENT
Filed April 10, 1941   5 Sheets-Sheet 1

INVENTORS
JOSEPH LYMAN
ELWOOD NORDEN
BY Herbert H. Thompson
THEIR ATTORNEY.

Feb. 2, 1943.    J. LYMAN ET AL    2,309,853
RATE AND ATTITUDE INDICATING INSTRUMENT
Filed April 10, 1941    5 Sheets—Sheet 3

INVENTORS
JOSEPH LYMAN
ELWOOD NORDEN
BY Herbert H. Thompson
THEIR ATTORNEY.

INVENTORS
JOSEPH LYMAN
ELWOOD NORDEN
BY
THEIR ATTORNEY

Patented Feb. 2, 1943

2,309,853

UNITED STATES PATENT OFFICE 2,309,853

RATE AND ATTITUDE INDICATING INSTRUMENT

Joseph Lyman, Huntington, and Elwood Norden, Pelham, N. Y., assignors to Sperry Gyroscope Company, Inc., Brooklyn, N. Y., a corporation of New York Application April 10, 1941, Serial No. 387,810

28 Claims. (Cl. 33—204)

This invention relates, generally, to rate and attitude indicating instruments and the invention has reference, more particularly, to a novel instrument especially adapted for giving navigational information such as the heading of a craft with respect to the meridian or other reference, the rate of turn of a craft, and the attitude of a craft about the fore and aft and transverse axes thereof.

Heretofore it has been common to employ gyroscopic instruments such as directional gyroscopes, turn gyroscopes and artificial horizontal gyroscopes for providing necessary rate and attitude indications for aircraft. In the present invention a vibrating rod or wire secured at one or both ends is employed for providing rate and attitude indications of movable craft, suitable electrical pick-off means being provided in connection with the vibrating rod or wire for picking-off electrical signals for operating suitable indicators giving the desired information.

One object of the present invention is to provide a novel direction indicating instrument suitable for use, among other purposes, as upon a moving craft to indicate the heading of the craft with respect to the meridian or other reference.

Another object of the invention is to provide a novel instrument adapted to serve as a rate of turn indicator for showing the rate of turn about any desired axis.

Still another object of the invention is to provide means for rigidly mounting a rod or wire at one or both ends and for vibrating the same, together with electrical pick-off means for producing potentials adapted to control a suitable indicating means.

A further object of the invention is to provide a direction indicator comprising a wire or rod member of U-shaped or substantially tuning fork form, the same being mounted for free turning about a central axis extending parallel to its arms and adapted to carry an angle indicator, together with means for vibrating the arms of said member, whereby said arms continue to vibrate in a fixed plane even though the case of the instrument be turned, thereby holding the angle indicator angularly stationary in space.

Still another object of the present invention is to provide a novel instrument employing a vibrating rod together with means for normally vibrating the same in a horizontal plane, said instrument having pick-off means and an indicator for indicating roll and/or pitch of the craft.

A further object of the invention is to provide an instrument including a cathode ray tube having its deflecting plates excited by a version of the outputs from pick-off coils associated with a horizontally vibrating rod, said cathode ray tube depicting on the face thereof an artificial horizon bar, the indications of which are similar to those of the standard artificial horizon.

Other objects and advantages will become apparent from the specification, taken in connection with the accompanying drawings wherein the invention is embodied in concrete form.

In the drawings.

Similar characters of reference are used in all of the above figures to indicate corresponding parts.

Figure 1:
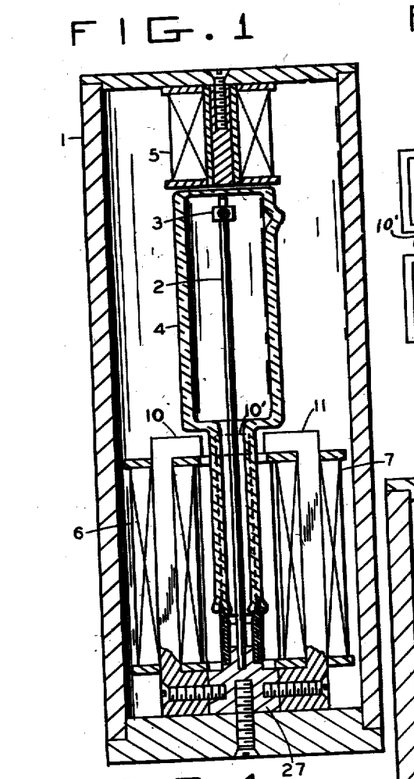
Fig. 1 is a vertical section through a form of our invention useful as a directional indicator.
Figure 2:
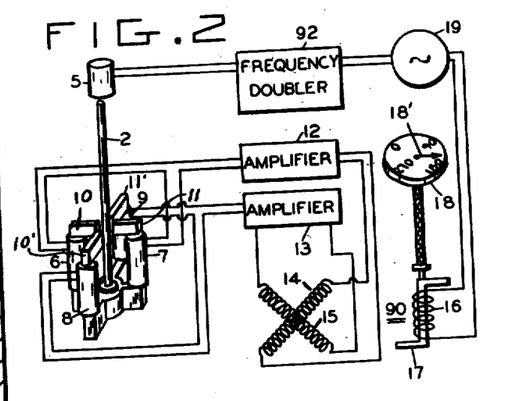
Fig. 2 is a fragmentary wiring diagram of the same, showing the electrical connections to a Telegon type indicator.

Referring first to Figs. 1 and 2, we have shown an outer casing 1, within which is rigidly secured at its lower end in the mounting support or holder 27 a round rod 2, which, therefore, is free to vibrate at its upper end and about its lower end as a center. The rate of vibration may be controlled by a mass 3 adjustably secured to the rod by a set screw. The vibration of the rod may be caused by an axial iron cored coil 5 through which pulsating or alternating current of approximately twice the natural frequency of the loaded rod is passed, the rod being preferably magnetically polarized. The plane of vibration of the upper end of the rod will remain fixed in space when the base 27 is rotated. The casing 1 may be pendulously mounted on a suitable universal support so that the base 27 thereof is normally maintained in an approximate horizontal plane. If the casing 1 tilts, the plane of vibration of the upper end of the rod 2 tilts correspondingly thereto, the vibrating plane remaining constant with respect to the case. An evacuated glass envelope surrounding rod 2 and sealed by a metal to glass seal to base 27 is preferably employed to lessen air resistance and to remove any spurious effects caused by air convection currents in the case 1. It is to be noted that the rod 2 may be caused to vibrate at the same frequency as that of the driving voltage if the rod is not magnetically polarized, although this is not a preferred method as it is somewhat inefficient.

In order to furnish an indication of the path of movement of the rod, we have shown a plurality (preferably four) of electrical pick-off coils 6, 7, 8, and 9 positioned symmetrically about said rod on the interior of casing 1. Each of said coils is shown as having iron cores, 10, 11, 10', 11', respectively, having their upper ends close to a narrow portion of the evacuated glass tube 4.

Assuming that the plane of vibration of the rod is in the plane of the paper, it will be evident that if the cores 10 and 11, of coils 6 and 7 respectively, are positioned in the plane of the paper on each side of the rod, pronounced alternating voltages will be induced therein. On the other hand a substantially negligible E. M. F. will be generated in the pick-off coils 8 and 9 positioned at right angles thereto. Should the plane of vibration of the rod be in the plane extending at right angles to the plane of the paper, considerable E. M. F. will be generated in the coils 8 and 9, and very little or no E. M. F. will appear in the coils 6 and 7. If the plane of vibration is at an angle between the two planes indicated, proportional E. M. Fs will be generated in both pairs of coils dependent on the trigonometric functions of the angles the plane of vibration makes with the planes of the coils. If the pair of coils 6, 7 are connected in series and coils 8, 9 similarly connected in series and these pairs of coils are connected in the manner shown in Fig. 2 through suitable amplifiers as 12 and 13 respectively, the generated voltages may be used to operate an indicator such as the A. C. self-synchronous repeater motor 90 having its crossed stator windings 14 and 15 connected respectively to the outputs of amplifiers 12 and 13.

We have shown in Fig. 2 one simple form of repeater motor known to the art as the Telegon type. The stationary coil 16 surrounding the Z-shaped rotor or turnable magnetic core 17 of motor 90 is excited from the same A. C. source 19 as excites the driving winding 5 through the frequency doubler 92. The output voltages of amplifiers 12 and 13 may also be used to operate a cathode ray tube in the manner shown in Fig. 6, or any other type of instrument which is capable of indicating the angle of the path of the free end of rod 2. Thus, in employing this device as a direction indicator as on a moving craft to take the place of a directional gyroscope, the pointer 18', which may have a friction drive or other adjustable connection with rotor 17, is initially set so that with rod 2 vibrating this pointer will indicate a desired reference direction such as magnetic north on the degree scale 18. Then as the craft is navigated the reading of pointer 18' with respect to the original scale setting of this pointer will furnish a continuous indication of the heading of the craft with respect to magnetic north.

Figure 3:
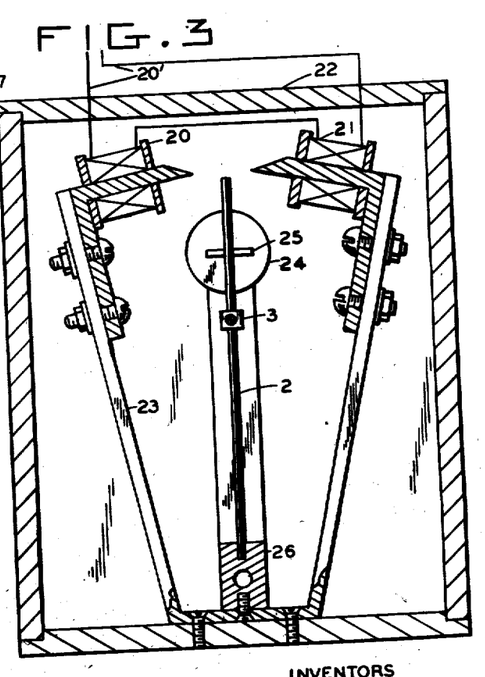
Fig. 3 is a vertical section through a form of our invention useful as a rate of turn instrument.

Fig. 3 illustrates our invention adapted to serve as a rate of turn indicator as for moving craft. A magnetically polarized round rod 2 is symmetrically clamped in a base 26, and is excited by alternating or pulsating current supplied from leads 20' and sent through oppositely disposed coils 20 and 21, adjustably mounted on yoke 23. The natural frequency of the rod 2 may be adjusted by means of the slidably mounted weight 3 to match the frequency of the exciting current. The rod 2 then vibrates in the plane defined by the axes of the exciting coils 20 and 21 which clearly distinguishes this form of the invention from that shown in Fig. 1. At right angles to this plane of vibration are placed two pick-off coils 24, one not being shown in the drawings.

Figure 4:
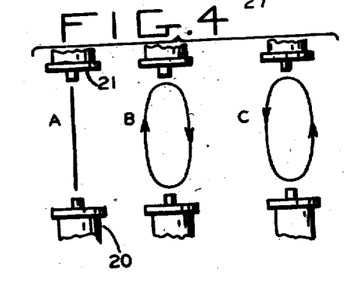
Fig. 4 is a diagram of three vibration paths, useful in explaining the invention shown in Fig. 3 and Fig. 4A as modified.

When the base 26 of the instrument is turned, as when the craft turns, gyroscopic forces exerted on the rod cause the end of the rod to tend to precess in directions at right angles to the axis of the turning couple and at right angles to the axis about which the rod vibrates, causing the free end of the latter to move in an elliptically shaped path. When the rod is traveling in one direction and the base is turning, gyroscopic reaction gives the rod a component of motion up out of the plane of the paper. When the rod reaches its maximum travel and reverses its direction, these same forces operate to force it down out of the plane of the paper. Analysis of the obvious form and experimental evidence show that these reactions result in the rod assuming an elliptical path, the major axis of this ellipse always remaining in the plane defined by the axes of the driving coils 20 and 21, and the length of its minor axis being functionally related to the rate of turn of the base 26, i. e., of the craft. Fig. 4 illustrates paths which the end of the rod may take under three different circumstances, the path A being that for no turn. During a clock-wise turn of the base 27 at a given rate, the path of the free end of rod 2 is illustrated by B, the arrows denoting the free end's direction of travel. During a counter-clockwise turn of equal rate, the path of the free end of the rod is illustrated by C, this end traveling in the opposite direction to that obtaining in B. As the rate of turn of the craft is increased or decreased, the magnitude of the minor axis increases or decreases, respectively.

Figure 13:
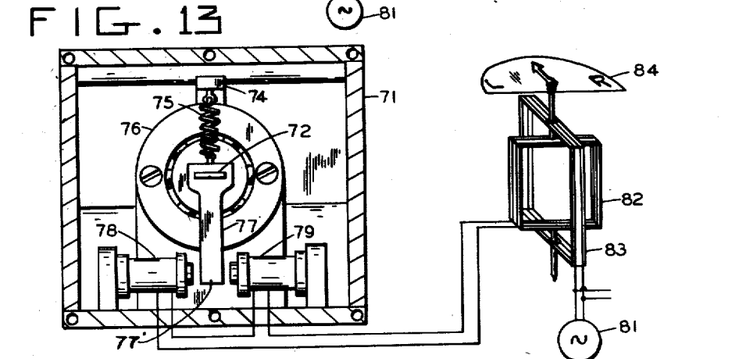
Fig. 13 is an end view of the same device, showing a fragmentary wiring diagram of a dynamometer type indicator for use with said device.

These components of motion perpendicular to the plane of at-rest vibration induce alternating voltages in the pick-off coils 24, the magnitude of said voltages depending on the rate of turn, and their phase upon the direction of turn, i. e., the phase reverses with a reversal in the direction of the turn. The phase reverses because of the fact that the direction that the end of rod 2 moves past the pick-off coils 24 reverses when the craft on which the instrument is mounted changes its direction of turn. The cores 24 are rectangularly shaped and oriented as shown in the drawing to produce a more nearly sinusoidal output. These reversing phase, variable magnitude voltages may be fed from coils 24 into one winding of a dynamometer type meter as shown in Fig. 13, the other winding of this meter being connected to leads 20' or these voltages may be fed into a thermionic phase detector to operate a direct current meter. A phase meter of the dynamometer type shown in Fig. 13 is more particularly disclosed on page 790 of the textbook published in 1940 entitled "Electrical Measurements and Measuring Instruments" by E. W. Golding. The device may be used to detect rate of turn about any axis when a suitable mounting is provided.

Figure 4A:
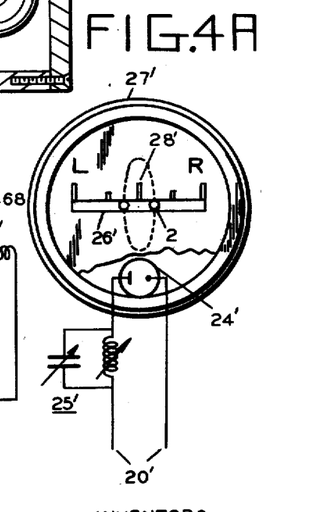

Fig. 4A shows a somewhat modified structure wherein the vibrating rod 2 is directly observed at a point in its path preferably at an end of its minor axis. This is accomplished in Fig. 4A by use of a neon lamp 24' connected in the pulsating supply circuit leads 20'. In order to adjust the point in the path at which lamp 24' will illuminate the end of rod 2 the phase adjusting circuit 25' is employed. The end of the rod 2 may be colored as by use of white pigment so that the same is more readily seen through the slotted window 26' of the instrument 27'. In operation, when the craft makes a turn to the right the end of the rod 2 will appear to move from opposite the central index 28' to the right as one looks through the window 26' as shown in Fig. 4A of the drawings. On the other hand, when the craft makes a turn to the left the end of the rod 2 will appear to move toward the left, i. e., will be seen at the other end of the free end minor axis of the path of motion of the free end of the rod shown in dotted lines in Fig. 4A. When the vibrating rod crosses the viewing slot at its extreme left or right position of movement, viewing the instrument from the front, the same is illuminated by lamp 24'. Thus, the operator is enabled by directly observing the instrument to determine whether or not the turn is to the right or to the left and the distance of the spot indicating the end of the rod from the central index 28' is a measure of the rate of turn.

Figure 5:
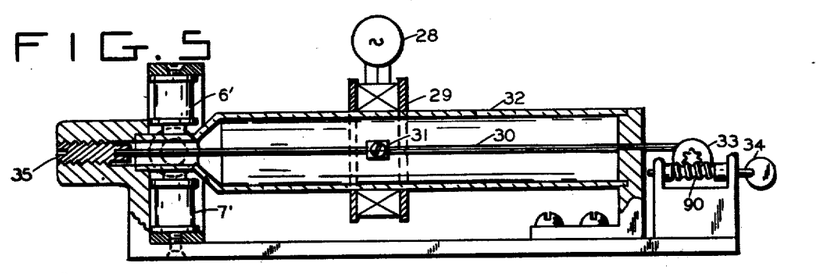
Fig. 5 is a horizontal section through a form of our invention employing a stretched wire clamped at both ends, which may be used as an attitude indicator.
Figure 6:
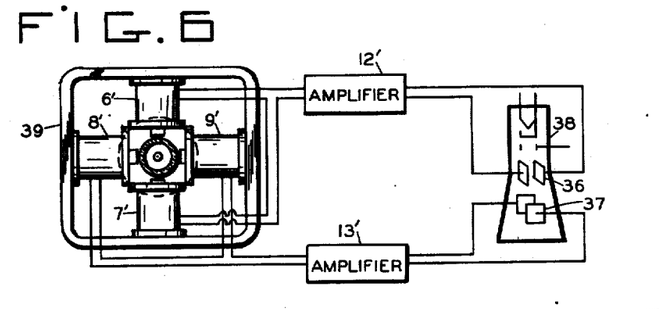
Fig. 6 is an end view of the device shown in Fig. 5, together with a fragmentary wiring diagram showing a cathode ray indicator operated therefrom.

Figs. 5 and 6 show another type of directional indicator employing a wire 30 which may be of magnetic material stretched between the clamped end 35 and a drum 33 around which the free end of the wire is wound. The tension of the wire may be adjusted by a worm and worm pinion 90 from a thumb piece 34, thereby adjusting the natural frequency of the wire to half that of the exciting current. Vibration of the wire may be produced by a three phase winding 29, excited by three phase alternating current. Pick-offs 6', 7', 8', and 9' may be employed as in Fig. 2 to actuate a suitable Telegon indicator, or the signal from the pick-offs may be applied to the deflecting plates 36, 37 of cathode ray tube 38 to give a visible indication of the path of vibration of the wire. The operation is essentially the same as that of the device illustrated in Figs. 1 and 2. The wire 30 is shown as enclosed within a glass or other non-magnetic tube 32, which is preferably evacuated to reduce air resistance. Adjacent to the pick-off coils 6', 7', 8' and 9' the tube is of reduced diameter so that the pick-off coils may be placed close to the wire. A magnetically polarized mass 31 may be secured near the center of the wire to decrease the period of vibration, thus decreasing the necessary length of the wire and making the instrument more compact.

Figure 7:
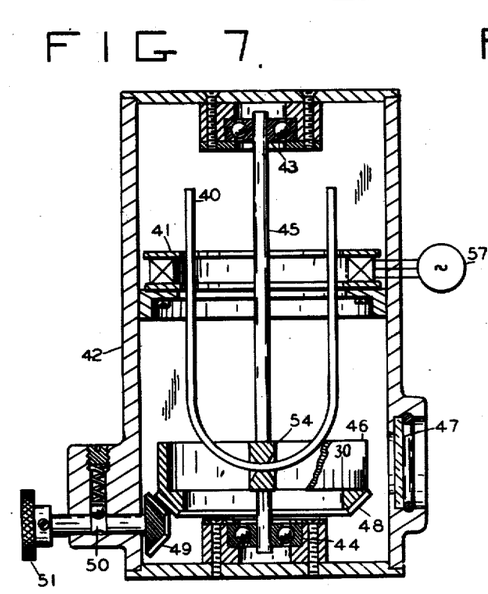
Fig. 7 is a vertical section through a form of our invention useful as a directional indicator.

Our invention is adaptable for use in still another form as a directional indicator. According to this form, as shown in Fig. 7, the vibratory rod is shown as a U-shaped member 40, that is preferably magnetically polarized, and may resemble a tuning fork clamped at its base in support 54, which, in turn, is rotatably mounted about a vertical axis in bearing members 43 and 44. The vibration of the tuning fork may be effected by circumferential three phase coil 41 excited by three phase alternating current from generator 57. To spoke pieces extending from the support 54 there may be secured a compass card 46, visible through window 47 providing a reference mark cooperating with the indications of said card, and means may be provided for resetting the same by pushing in setting knob 51 carrying a bevel pinion 49 thereon adapted to engage a bevel gear 48 on the compass card, the knob 51 being pulled out and held by detent 50 after resetting. In this type of instrument, the tuning fork maintains its plane of oscillation by means of gyroscopic reaction. The instrument is useful in any of the three coordinates.

Figure 8:
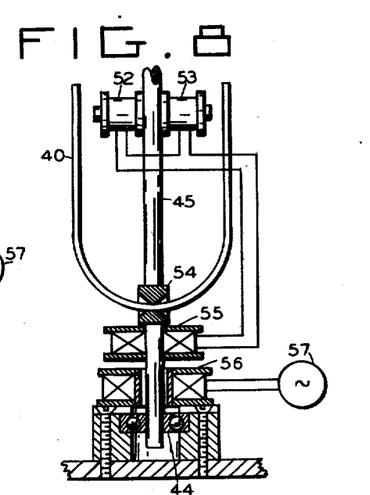
Fig. 8 is a modification of the device shown in Fig. 7.

Another means of driving the tuning fork type of directional indicator is shown in the fragmentary view of Fig. 8. The coil 56 is rigidly attached to the base of the instrument and the coil 55 to the rotatable shaft 45. The shaft 45 being made of a magnetic material, the two coils and shaft act together as a transformer, thus avoiding the use of slip rings and supplying alternating or pulsating energy to the driving coils 52 and 53 from coil 55, coils 52 and 53 being mounted to rotate with the shaft 45.

Figures 9, 10:
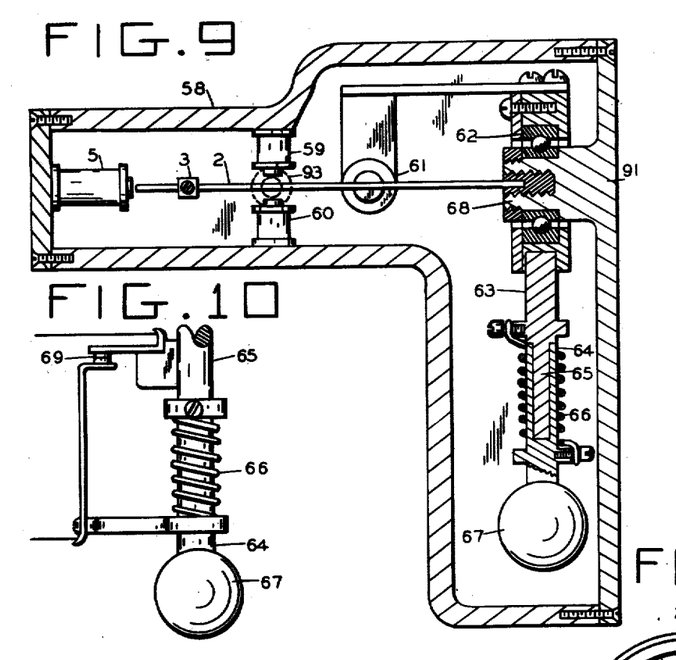
Fig. 9 is a horizontal section through another form of our invention which performs the functions of an artificial horizon.
Fig. 10 is a detail of Fig. 9 taken at right angles to that figure.
Figure 11:
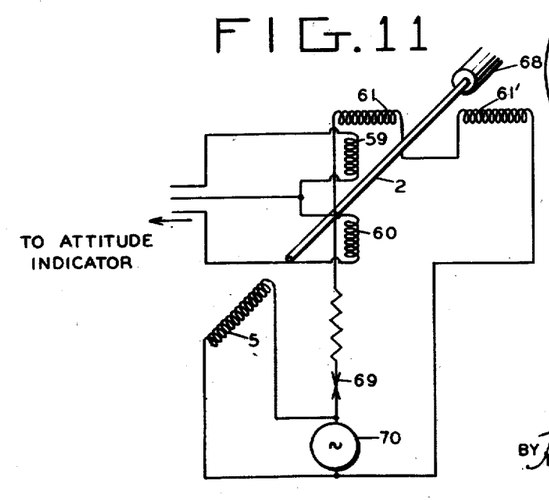
Fig. 11 is a simplified wiring diagram useful in explaining the device shown in Figs. 9 and 10.

Our invention is also adapted to use as an artificial horizon, one such form being shown in Figs. 9, 10 and 11. In this form of the invention, round magnetically polarized rod 2 is clamped at one end in the casing 58 in a horizontal position and is vibrated by an A. C. or pulsating current sent through a solenoid 5. The plane of oscillation of the rod 2 is normally maintained horizontal by electromagnets 61 secured to a bearing member 62, which is rotatably mounted on boss 91 on the interior of casing 58 in which rod 2 is secured. The axes of magnets 61 are normally maintained truly horizontal by a pendulum 67 secured to said bearing member, so that under normal conditions the rod 2 vibrates in a horizontal plane and therefore generates no signals in the pick-off coils 59 and 60. If the support becomes inclined, the position of the pick-off coils will be changed with respect to the plane of vibration of the rod, which plane is held horizontal by the stabilized magnets 61, and therefore a signal will be generated in pick-off coils 59 and 60 that is a function of the sine of the angle of tilt. This signal may be applied for visual observation to any of the aforementioned indicating devices. This instrument may be used in an obvious manner to indicate either roll or pitch in an aircraft, depending on the manner in which said instrument is mounted.

We have also shown a means in Fig. 10 for interrupting the excitation of electromagnets 61 when the vehicle on which the device is mounted makes a turn. Under such conditions, the total acceleration forces on the pendulum will be slightly increased in accordance with the vector resultant of the acceleration force of gravity and the centrifugal acceleration force. As shown, the pendulum bob 67 is secured to a sleeve 66 slidably mounted on a stem 65, the mass of the pendulum being normally just balanced by the coil spring 66. Therefore, in the presence of acceleration forces, the pendulum bob will move downwardly slightly and thus break contacts 69, one of which is secured to the pendulum bob and the other to the fixed stem 65. Said contacts are normally in series with the coils 61 and when opened interrupt the restraint exerted on the vibrating rod by the coils 61. The effect of this interruption is to provide a means for averaging out normal turn errors. There may be placed two pick-off coils 93 at right angles to the coils 59 and 60, as indicated by dotted lines in Fig. 9, for use of the instrument as part of an attitude indicator to register pitch and roll of an aircraft as shown in Fig. 9A.

Figure 9A:
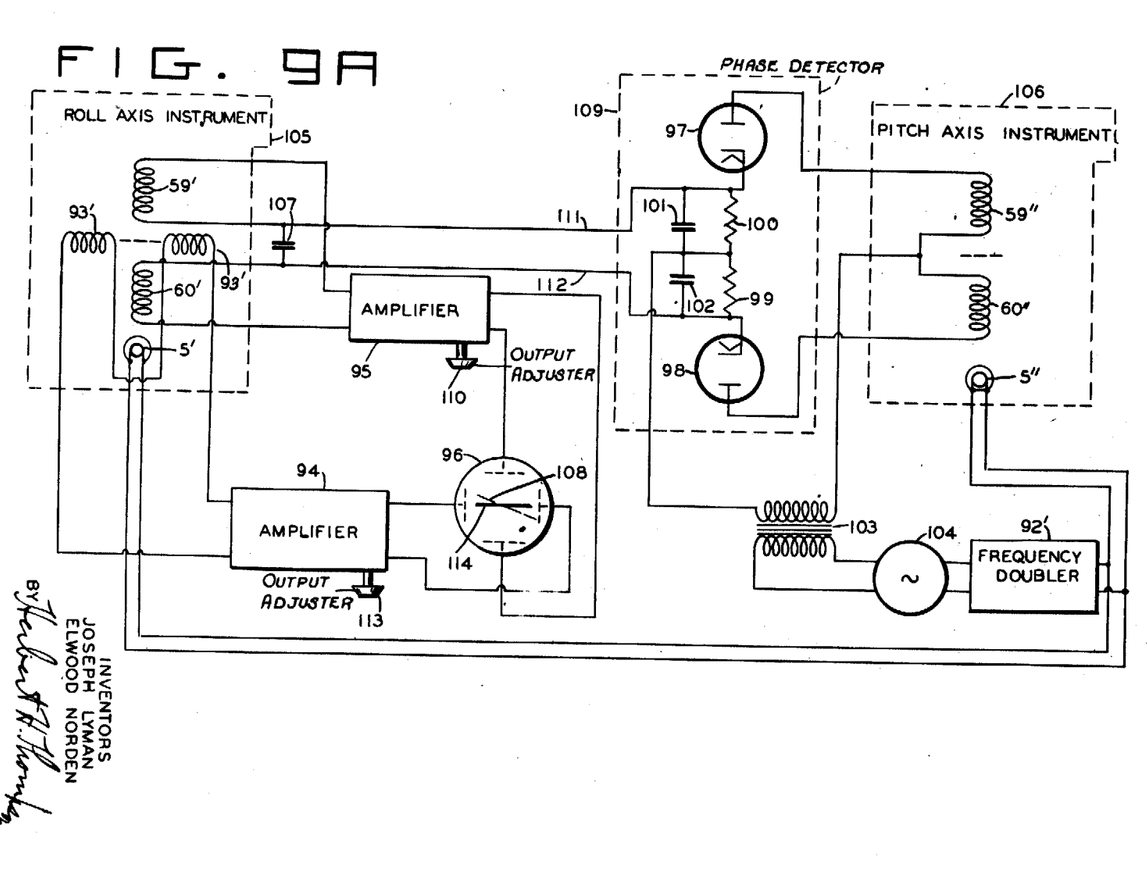
Fig. 9A illustrates an adaptation of the structure of Fig. 9.

In Fig. 9A we produce on the screen of the cathode ray tube 96 a line 108 whose position in the vertical direction depends upon the angle of pitch and whose angle to the horizontal index line 114 marked on the face of the tube indicates the angle of roll. This effect is produced by the following means.

For indicating pitch we have shown schematically an instrument 106 like that of Fig. 9, with no horizontal pick-off coils 93, but with two vertically mounted pick-off coils 59" and 60", the device being mounted so that the end of the rod 2 vibrates for normal level flight in a direction parallel to the direction of flight of the aircraft. For indicating roll, we employ another instrument 105 like that of Fig. 9 which has pick-off coils mounted horizontally (93') as well as vertically (59', 60'). This instrument is mounted so that its rod 2 vibrates in a horizontal line at right angles to the line of vibration of the free end of the rod 2 in instrument 106. The rods are driven by means of power supplied from generator 104 through frequency doubler 92' to exciting coils 5' and 5".

From the roll axis instrument 105, alternating voltages which appear in pick-off coils 59' and 60' are applied to the vertical plates of cathode ray tube 96 through amplifier 95. Alternating voltages which appear in the coils 93' are applied through amplifier 94 to the horizontal plates of the cathode ray tube. Thus, when rod 2 of roll axis indicator 105 is vibrated a straight line trace appears on the cathode ray tube screen. From previous discussion of Fig. 9, it is evident that the angle said trace makes with index mark 114 on the face of the screen then indicates to the pilot the angle of roll.

As is well known in the art, the pitch angle is usually indicated by the distance of the center of trace 108 above or below index 114, the trace appearing above the index when the aircraft dives, and below when the craft climbs. The instrument 106 is mounted to provide this indication. The signal from coils 59" and 60" is, by means of the electronic phase detector 109, compared in phase with a signal from generator 104 through transformer 103, by means of diodes 97 and 98. Whenever the aircraft's aspect angle is altered, a direct current signal appears on wires 111, 112, said signal being proportional to $E_1 E_2 \cos \theta$, where $E_1$ is the voltage from transformer 103, and $\theta$ is the phase angle between those two voltages. This direct current voltage is amplified by amplifier 95, said amplifier being designed to amplify direct current as well as alternating current signals, and thence is applied to the vertical plates of cathode ray tube 96. Knobs 113 and 110 are provided on amplifiers 94 and 95, respectively, to furnish means for adjusting their outputs.

Figure 12:
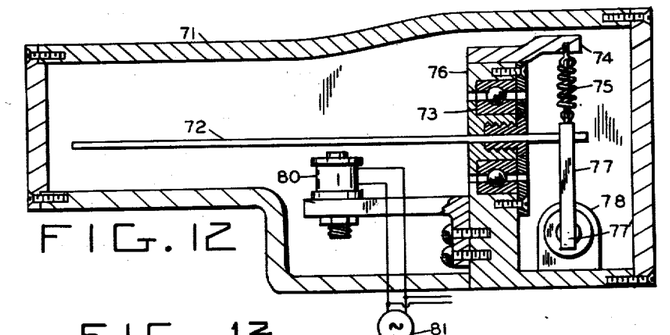
Fig. 12 is a horizontal section of another form of our invention useful as a rate of turn indicator.

Another form of turn indicator type of instrument is shown in Figs. 12 and 13. In these figures the rod is shown as a flat magnetically polarized strip 72 clamped near one end in a bearing member 73 so that the flat surface of the rod is horizontal. Member 73 is rotatably mounted in a bracket within casing 71. By flattening the strip and by using a centralizing spring 75 extending between the short end of the rod and bracket 74, a vertical plane of vibration is predetermined. A coil 80 supplied with alternating or pulsating current is shown for the purpose of vibrating the strip. Upon turn of the craft, the plane of vibration of the end of the rod will depart from a vertical plane and become a figure eight as shown at B in Fig. 14. The amplitude and phase of the vibration again are functionally related to the rate of turn and to the sense of turn, respectively. Due to the dissymmetry in stiffness of the flat rod, the clamped end of the rod will twist with the same frequency of vibration with which the other end of the rod vibrates back and forth. The behavior of the rod under these circumstances may be arrived at from obvious analysis somewhat similar to that used in discussing the rod 2 of Fig. 3.

As a pick-off for this type of instrument, we have shown a downwardly extending permanent magnetic member 77 secured to the short end of rod 72. On each side of the lower end of the magnet are shown pick-off coils 78 and 79. When the aircraft is at rest or moving uniformly in a straight line, the magnetic pole 77' of the magnet 77 will remain stationary, but upon turn of the craft it will be oscillated between the pick-off coils at a frequency equal to the frequency of the vibration of the rod 72 with an amplitude proportional to the rate of turn and a phase depending on sense of turn. Any suitable form of indicator may be actuated therefrom such as a left-right turn indicator 84, which is a zero center dynamometer type meter. As is well known in the art, coil 83 of this meter is fixed and may be supplied with the same frequency as the driving coil 80; and coil 82, to which the indicator needle is fastened takes up a position according to the amplitude and phase (with respect to the phase of source 81) of the voltage generated by the pick-off coils 78 and 79.

Figures 14, 15:
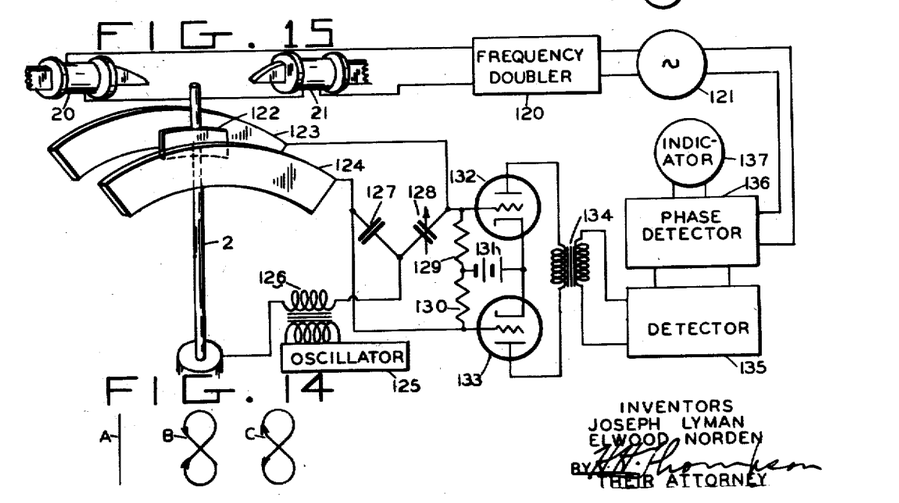
Fig. 14 is a diagram of three vibration paths useful in explaining the invention shown in Fig. 13.
Fig. 15 is a schematic illustration of a modified form of our rate of turn instrument illustrated in Fig. 3 and showing the use of capacity pick-offs.

Fig. 15 shows a modification of the rate of turn instrument of Fig. 3 adapted for use with capacitive pick-offs in place of the electromagnetic pick-offs 24 shown in Fig. 3. Referring to Fig. 15, the rod 2 is driven by power supplied to exciter coils 20 and 21 through frequency doubler 120 from generator 121. The theory of operation of the rod 2 is exactly that described in discussing Fig. 3. When the craft on which the instrument is mounted is at rest or is maintaining straight line flight, the rod 2 vibrates in a straight line path in the plane defined by the axis of the rod and the coils 20 and 21 so that the ratio of the capacity between plates 122 and 123 to that between the plates 122 and 124 is a constant. If the craft makes a turn, the path of the end of rod 2 opens into an ellipse, and plate 122 then has an alternating component of motion such that this capacity ratio varies with a frequency equal to that of the rod 2.

An alternating current bridge is employed and is made up of these two capacities and the condensers 127 and 128. The condenser 128 is made variable so that the ratio of the capacities of condensers 128 to 127 may be made the same at the ratio of the capacities between plates 122 and 123 to that between plates 122 and 124 for straight line vibration of the rod corresponding to straight flight. To one set of midpoints of this bridge is applied an alternating current of the frequency $f$ (on the order of 10,000 cycles) generated by oscillator 125 and fed through transformer 126. As long as the rod vibrates in a straight line parallel to the plates, the bridge remains balanced; but when the pick-off capacity ratio varies due to a turn of the craft, the frequency $f$ modulated by the frequency of the rod 2 appears at the other midpoints of the bridge and is placed across series resistors 129 and 130. By means of triodes 132 and 133, this signal is amplified and fed to the detector circuit 135, which removes the frequency $f$ signal, leaving a low frequency voltage. The magnitude of this low frequency voltage depends upon the rate of turn of the craft and its phase upon the direction of the turn.

The phase detector 136 operates in a similar manner to that shown as circuit 109 in Fig. 9A. In phase detector 136, the reversing phase low frequency signal voltage is compared to the phase of the standard signal provided by generator 121. The indicator 137 may be any of the devices suggested for operation with the instrument shown in Fig. 3. The device is useful in any of the three coordinates, providing suitable mounting is provided.

Also, while we have not heretofore referred to our invention as a gyroscope since the motion of the oscillating mass is vibratory rather than of continuously rotational, apparatus constructed in accordance with our invention seems to posses many of the properties of gyroscopes and it is probably not incorrect, therefore, to refer to the invention as a vibratory gyroscope.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a rate of turn instrument, a support, a rod carried by said support, means for vibrating said rod in a plane, and electrical pick-off means positioned adjacent said vibrating rod for producing potentials responsive to movements of said rod departing from vibration in said plane.

2. In an instrument of the character described, a support, a rod or wire carried by said support, electrical means for vibrating said rod or wire, electrical pick-off means positioned adjacent said vibrating rod or wire for producing potentials responsive to movements of said rod or wire departing from vibration in a plane, and indicating means controlled from the output of said pick-off means.

3. A direction indicating instrument comprising a substantially vertical rod fixed at one end and free to vibrate at its other end, electromagnetic means for vibrating the free end of said rod at substantially the natural frequency thereof, pick-off coils disposed about said rod for generating potentials responsive to the path of vibration thereof, and a direction indicator controlled from the outputs of said pick-off coils.

4. In a direction indicating instrument, a support, a rod or wire carried by said support, means for vibrating said rod or wire in a plane, and electrical pick-off means positioned adjacent said vibrating rod or wire for producing potentials responsive to movements of said rod or wire departing from vibration in said plane responsive to movements of said pick-off means with respect to said plane of vibration of said rod.

5. A direction indicating instrument comprising a substantially vertical rod supported at one end and free to vibrate at its other end, a varying source of current supply, a magnet coil disposed adjacent the free end of said rod in substantial alignment with the vertical axis thereof and excited from said source for vibrating said rod, two pairs of pick-off coils surrounding said rod and disposed substantially at right angles to one another, an indicator having crossed stator windings connected respectively to be energized with a version of the output of a respective pair of said pick-off coils, said indicator having a rotor provided with a winding excited from said source, and direction indicating means actuated by said rotor.

6. A rate of turn indicating instrument comprising a substantially vertical rod supported at one end and free to vibrate at its other end, a varying source of current supply, electro-magnetic coils disposed on opposite sides of said rod and excited from said source for vibrating said rod in a desired vertical plane, pick-off coils disposed on opposite sides of said rod at right angles to said vibrating coils for producing potentials responsive to motion of the rod at right angles to its plane of vibration between said vibrating coils, and an indicator having a winding excited by a version of the output of said pick-off coils and another winding excited from said source, said windings being relatively movable.

7. In an instrument of the character described, a rod or wire, means for supporting said rod or wire, electromagnetic means fed from said source and arranged for vibrating said rod or wire, and means for loading said rod or wire so that its natural frequency is made a function of the frequency of said source.

8. In a direction indicator, a wire secured at both ends, electromagnetic means for vibrating said wire, an electrical pick-off disposed adjacent said wire, and a direction indicator controlled from said pick-off.

9. In a direction indicator, a wire secured at both ends, a driving coil surrounding said wire, said coil being arranged to be energized with alternating current for vibrating said wire, means for varying the tension of said wire so that its natural frequency will substantially conform to that of said alternating current, two pairs of pick-off coils disposed at right angles to one another about said wire, and an indicator controlled from said pick-off coils.

10. In a direction indicator for movable craft, a wire secured at both ends, a driving coil surrounding said wire, said coil being arranged to be energized with alternating current for vibrating said wire, means for varying the tension of said wire so that its natural frequency will substantially conform to that of said alternating current, two pairs of pick-off coils disposed at right angles to one another about said wire, a cathode ray tube having deflecting plates, means for supplying a version of the output of one pair of said pick-off coils to one pair of said plates, and means for supplying a version of the output of the other pair of said coils to the other pair of deflecting plates of said tube, whereby the cathode ray beam of said tube is caused to draw a line the direction of which varies with change in course.

11. In a direction indicator, a U-shaped rod member having two vertical legs and a transverse connecting portion, a turnable support for said rod member connected to said transverse portion substantially midway between said legs, means for vibrating the legs of said member in a common plane, and a compass card carried by said turnable support.

12. In a direction indicator, a U-shaped rod member having two vertical legs and a transverse connecting portion, a turnable support for said rod member connected to said transverse portion substantially midway between said legs, electrical means for vibrating the legs of said member in a common plane, a compass card carried by said turnable support, and means for turning said compass card and said support for setting up a desired course.

13. Means for indicating roll or pitch of a craft comprising a substantially horizontally disposed rod supported at one end and free to vibrate at its other end, means for vibrating said rod and for normally maintaining the plane of such vibration horizontal, pick-off coils disposed adjacent said rod, and indicating means controlled from a version of the outputs of said coils.

14. Means for indicating roll or pitch of a craft comprising a substantially horizontally disposed rod supported at one end and free to vibrate at its other end, means for vibrating said rod, pendulously controlled means for normally maintaining the plane of vibration of said rod horizontal, means for nullifying the operation of said pendulously controlled means during turning movements for averaging out turn errors, pick-off coils disposed on opposite sides of said rod, and an attitude indicator controlled from the outputs of said pick-off coils.

15. An instrument for indicating pitching of a craft comprising a rod supported at one end for extending substantially transversely of the craft, a driving coil excited by varying current disposed adjacent the free end of said rod for vibrating said rod, pendulously controlled electromagnetic means for confining the vibration of said rod in a direction substantially parallel to the direction of flight of the craft, pick-off coils disposed above and below said rod, and indicating means controlled from the outputs of said coils.

16. An instrument for indicating rolling of a craft comprising a rod supported at one end for extending substantially fore and aft of the craft, a driving coil excited by varying current disposed adjacent the free end of said rod for vibrating said rod, pendulously controlled electromagnetic means for confining the vibration of said rod in a direction substantially at right angles to the direction of flight of the craft, two pairs of pick-off coils disposed at right angles to one another around said rod, and indicating means controlled from the outputs of said coils.

17. An artificial horizon indicating instrument for aircraft comprising a pair of rods fixed at one of their ends and free to vibrate at their other ends, means for vibrating said rods horizontally, pick-off coils disposed about said vibrating rods, a cathode ray tube having deflecting plates, and means for applying versions of the outputs of said pick-off coils to the deflecting plates of the cathode ray tube to produce an artificial horizon line movable in response to rolling and pitching of the craft.

18. A turn indicator for aircraft comprising a flat rod extending substantially horizontally and rotatably supported at one point along its length for turning about a horizontal axis, a centrallizing spring connected to said rod and to a relatively fixed support, means for vibrating said rod in a vertical plane, pick-off means associated with said rod and an indicator operated from said pick-off means.

19. In a rate of turn instrument, a substantially vertical rod fixed at one end, a source of alternating current, means fed from said source for vibrating the other end of said rod in a plane, a bridge circuit including capacity pick-off means extending adjacent said rod, a phase detector connected for comparing the phase of said source with the output of said bridge circuit, and an indicator controlled from said phase detector.

20. In a rate of turn instrument, a support, a rod or wire carried by said support, means for vibrating said rod in a plane and stroboscopic means for directly indicating departures of said rod from its plane of vibration.

21. A vibratory gyroscope comprising a pivoted mass, means for causing continuous vibration of said mass in some pattern, and means for indicating departure of the path of movement of said mass from said pattern.

22. A vibratory gyroscope comprising a pivoted mass, means for causing continuous vibration of said mass in a plane, and means for indicating the direction and amount of departure of the vibratory movement of the mass from said plane.

23. A vibratory gyroscope of the rate of turn class, comprising a rod clamped at one point, means for vibrating said rod about one horizontal axis whereby, upon turn of the craft, precession will cause vibration also about a second axis, pick-off means for detecting such change in the path of vibration, and a turn indicator operated from said pick-off means.

24. A vibratory gyroscope of the directional gyroscope type, comprising a rod, a clamp for mounting said rod pivotally about a normally horizontal axis, means for mounting the clamp for free movement about a vertical axis, and means for continually vibrating the free end of said rod without coercing the same in any plane.

25. A vibratory gyroscope of the directional gyroscope type, comprising a rod, a clamp for mounting said rod pivotally about a normally horizontal axis, means for mounting the clamp for free movement about a vertical axis, means for continually vibrating the free end of said rod without coercing the same in any plane, a plurality of pick-off coils adjacent the vibrating portion of said rod, and a self-synchronous repeater compass actuated therefrom.

26. A directional gyroscope of the vibratory type, as claimed in claim 25, in which said rod is in the form of a tuning fork, the center portion of which is journaled for turning about a vertical axis.

27. An attitude indicator for aircraft comprising a fixed support, a vibratory rod clamped thereon at one point, magnetic means for coercing said rod to cause it to vibrate in a definite plane, a pendulous member for stabilizing said means whereby a force is exerted on said rod to change its plane of vibration upon relative tilt of said pendulous means and support, pick-off means responsive to changes in the plane of vibration of said rod, and an attitude indicator actuated by the output of said pick-off means.

28. An attitude gyroscope of the vibratory type, comprising a pivoted mass, means for fixing the normal vibration thereof in a horizontal plane, and means for indicating a change in the path of movement of said vibratory means.

JOSEPH LYMAN.
ELWOOD NORDEN.